United States Patent [19]
Briones

[11] Patent Number: 5,246,389
[45] Date of Patent: Sep. 21, 1993

[54] HIGH DENSITY, FILTERED ELECTRICAL CONNECTOR

[75] Inventor: Francisco R. Briones, Markham, Canada

[73] Assignee: Amphenol Corporation, Wallingford, Conn.

[21] Appl. No.: 21,111

[22] Filed: Feb. 23, 1993

[51] Int. Cl.⁵ .......................................... H01R 13/66
[52] U.S. Cl. .................................... 439/620; 333/185
[58] Field of Search .............................. 439/608, 620; 333/181–185

[56] References Cited

U.S. PATENT DOCUMENTS

| | | | |
|---|---|---|---|
| 3,569,915 | 3/1971 | Sorensen et al. | 439/608 |
| 3,790,858 | 2/1974 | Brancaleone et al. | 317/99 |
| 4,431,251 | 2/1984 | Krantz | 339/143 R |
| 4,500,159 | 2/1985 | Briones et al. | 439/620 |
| 4,884,982 | 12/1989 | Fleming et al. | 439/620 |
| 4,929,196 | 5/1990 | Ponn et al. | 439/620 |
| 4,934,960 | 6/1990 | Capp et al. | 439/620 |
| 5,057,041 | 10/1991 | Yu et al. | 439/620 |
| 5,094,628 | 3/1992 | Kano | 439/620 |
| 5,102,354 | 4/1992 | Crane et al. | 439/620 |
| 5,112,253 | 5/1992 | Swift | 439/620 |
| 5,158,482 | 10/1092 | Tan et al. | 439/620 |

FOREIGN PATENT DOCUMENTS 53-86387  7/1978  Japan.

*Primary Examiner*—Gary F. Paumen
*Attorney, Agent, or Firm*—Bacon & Thomas

[57] ABSTRACT

A high-density electrical connector filtering arrangement includes a dielectric insert having a passage for an electrical contact, a second parallelly extending passage in which a chip capacitor is placed, and a ground plate extending transversely to the contact and through which the contact passes without electrical connection thereto. The live electrode of the chip capacitor is electrically connected to the contact via an integral tab extending from the contact in a direction transverse to a longitudinal direction of the contact, and parallel to the ground plate, the chip capacitor being biased against the tab and electrically connected to ground by a resilient finger or extension having a distal end displaced from the ground plate in a direction parallel to the contact axis and having a ground electrode engaging surface which extends transversely to the contact axis.

11 Claims, 1 Drawing Sheet

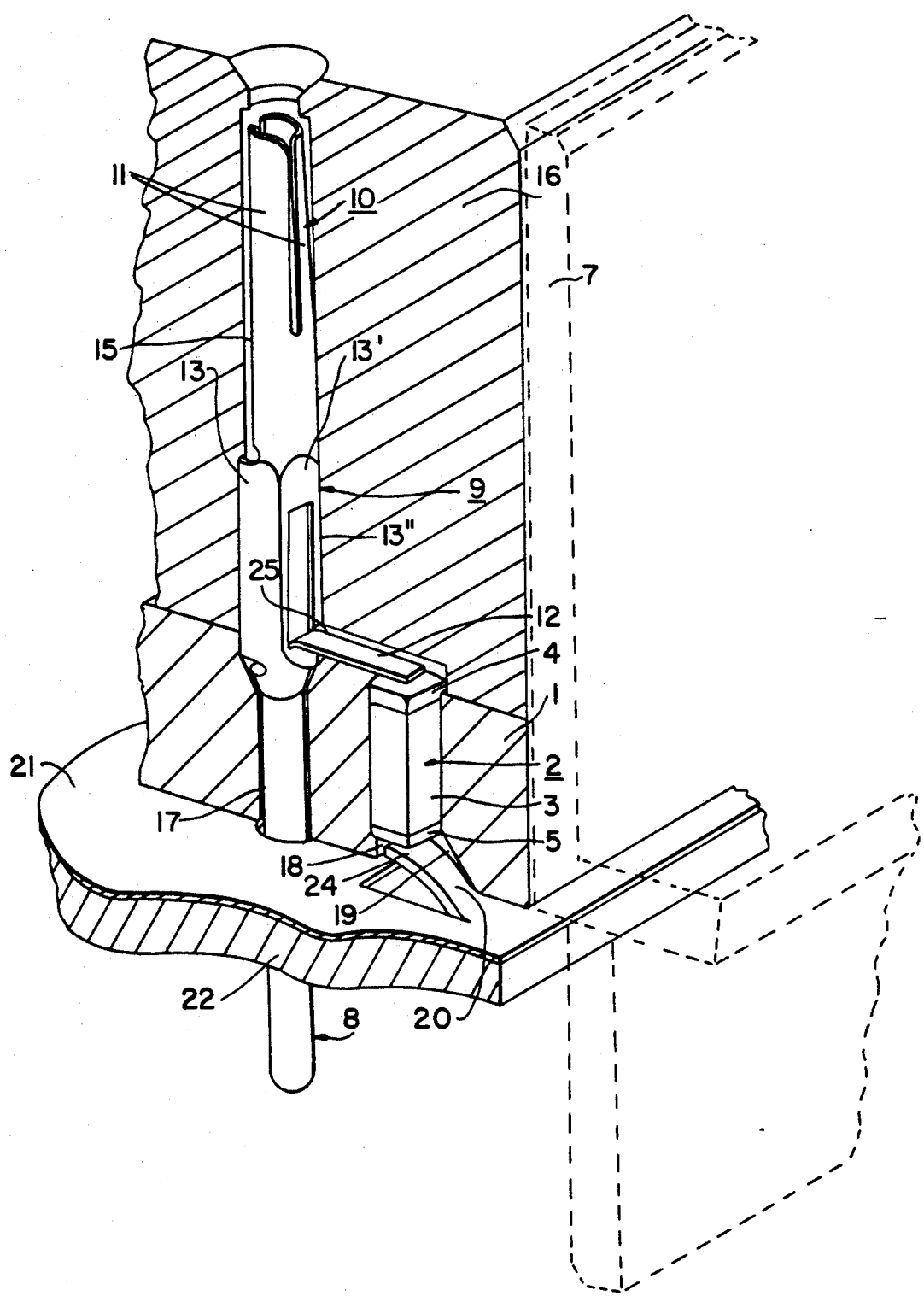

HIGH DENSITY, FILTERED ELECTRICAL CONNECTOR

BACKGROUND OF THE INVENTION

1. Field of the Invention

This invention relates to the field of electrical connectors, and in particular to a capacitive filtering arrangement for an electrical connector.

2. Description of Related Art

A practical arrangement for utilizing chip capacitors in multiple-pin electrical connectors in order to provide filtering of high frequency transients was first proposed in U.S. Pat. No. 4,500,159 (Briones). Previous capacitive filtering arrangements had required relatively expensive monolithic capacitor filters or individual filter sleeves for each contact. In contrast, the Briones connector relies on a completely different structure, based on an insert having a plurality of contact passages and a plurality of recesses in communication with the contact passages, the recesses permitting individual chip capacitors to be inserted such that one electrode on each capacitor engage a respective one of the signal contacts, in order to establish an electrical connection therewith. Connection to ground in the Briones connector is provided by a ground member or clip which also serves to resiliently bias the chip capacitors against the contacts, thus avoiding the need for soldering of the filters to the contacts. Resilient fingers on the clip engage the second electrode on each of the capacitors to provide both the electrical connection and the bias. A second embodiment described in the Briones patent varies this arrangement providing the biasing fingers on the contacts themselves.

The basic Briones design has since been adapted for a variety of purposes other than the original multi-pin filter connectors specifically disclosed in the Briones patent. Examples of subsequent adaptations of the basic Briones design are found, for example, in U.S. Pat. Nos. 4,884,982 (Fleming) and 4,929,196 (Pond et al.), 4,934,960 (Capp et al.) and 5,102,354 (Crane et al.).

Despite the advantages of the Briones chip capacitor design, the use of individual filter sleeve designs persists, especially in connectors in which the use of an external ground clip is impractical. These filter sleeve connector designs have in common the use of a grounding plate positioned transversely to the contacts, a pioneering example of which was disclosed in U.S. Pat. No. 3,569,915 to Sorenson. While it would be desirable because of the cost advantages and simplicity of chip capacitor designs to use clip capacitors even in Sorenson type connectors, the combination has heretofore been impossible to implement due to the relatively great structural dissimilarities between external ground clip designs of the type disclosed in Briones and ground plate designs of the type disclosed by Sorenson. The present invention therefore seeks to provide a practical way of utilizing capacitive filter chips in connection with a transversely extending group plate, thus permitting the maximum possible flexibility in grounding designs for filter connectors. The proposed arrangement can be used in a variety of connectors and, in particular, in adapters of various kinds, including those with circular and rectangular cross sections, and in connection with a variety of different contact pin configurations.

The problem of utilizing chip capacitors in connection with a transverse ground plate was previously considered by Yu et al. in U.S. Pat. No. 5,057,041, with less than completely satisfactory results. This patent discloses chip capacitors electrically connected between an electrical contact and spring tines in a ground plate. However, the Yu design requires the live electrode of the capacitor to be positioned in a receptacle means provided on the contact. The need for this relatively complicated structure results from the placement of the capacitors transversely to the principal axes of the contact which increases the required distance between signal contacts and makes it difficult to establish support for the capacitors while at the same time also establishing a secure electrical connection to the ground plate. In contrast, the present invention proposes to place the capacitor chips parallel to the signal contacts, thus decreasing the distance between the contacts while nevertheless providing a secure electrical connection to the ground plate with a simplified structure that eliminates the need for a receptacle means of the type required by the Yu design.

The present invention thus proposes to provide chip capacitors instead of the conventional filter sleeves in an electrical connector having a common ground plate positioned transversely to axes of the contacts, but does so by placing the capacitors in a direction parallel to the contacts, i.e., by arranging capacitors so that their principal axes between the end electrodes are parallel to axes of the contacts, rather than transverse thereto, greatly simplifying both the contact structure and the ground plate structure.

SUMMARY OF THE INVENTION

It is accordingly an objective of the invention to provide chip capacitors for filtering purposes in an electrical connector of the type in which the ground electrodes of the chip capacitors are connected to ground via a ground plate extending transversely to the signal contacts and through which the signal contacts pass, in order to extend the advantages of chip capacitor filter connector designs to connectors which previously required sleeve-like capacitor filters, and also to overcome the practical disadvantages of the connector disclosed in U.S. Pat. No. 5,057,041 by eliminating the need for providing capacitor mounting receptacles on the signal contacts themselves, while nevertheless providing for solderless electrical connections at both ends of the capacitive filter chips.

This objective is achieved by providing the electrical filter connector with a dielectric insert having a plurality of first passages for the signal contacts and a plurality of parallel second passages for supporting the chip capacitors in a direction parallel to the axes of the contacts. As a result, electrical connection to the connector's signal contacts may be provided by a simple tab, rather than a receptacle, extending transversely to the respective contacts. No receptacle need be provided on the signal contacts since the capacitors are supported by the dielectric inset. Electrical connection to the ground plate is established by resilient tines whose ends are displaced from the ground plate in a direction parallel to the axes of the signal contacts.

BRIEF DESCRIPTION OF THE DRAWING

The sole drawing FIGURE is a perspective view, partially in cross section, showing a preferred arrangement for mounting a chip capacitor in an electrical filter connector with the principal axis of the capacitor extending parallel to a principal axis of the signal contact.

DETAILED DESCRIPTION OF THE PREFERRED EMBODIMENT

The preferred arrangement for mounting a chip capacitor in an electrical connector, as shown in the drawing FIGURE, includes a dielectric insert 1 for supporting a chip capacitor 2 which is in the form of a dielectric body 3 having a live electrode 4 at one end and a ground electrode 5 at the other, with a principal axis extending between the electrodes 4 and 5. The chip capacitor 2 is conventional and provides a path for high frequency transients between a signal contact 6 and ground, which is provided in this example by the shell 7 of the connector.

The signal contact 6 is illustrated as including a pin portion 8, an intermediate section 9, and a socket section 10 formed by a pair of resilient tines 11. While the structure of the intermediate section 9 is unique to the present invention, it will be appreciated by those skilled in the art that the shape of mating portions 8 and 10 is dictated by the requirements of the context in which the contacts are used, and may take many forms, including pin-pin and socket-socket adapter arrangements. The intermediate section 9, in the illustrated embodiment, is characterized by a tab 12 extending from the intermediate section in a direction transverse to the principal longitudinal axis of the contact 6. The remainder of the intermediate section 9 may take any form, although the illustrated contact 6 is in the form of a plate spring bent to form three sides 13, 13', and 13", with the tab being cut out of the connecting side 13'. Most of the intermediate portion 9 of the contact 6 is positioned within a passage 15 in a second dielectric insert 16, while the pin portion of the contact and a small portion of intermediate section 9 are positioned in a contact passage 17 which extends through the chip-capacitor-supporting dielectric insert 1.

Extending parallel to contact passage 17 of insert 1 is a second passage 18 which passes completely through the dielectric insert 1 and has an enlarged portion 19 at one end. The passage 18 is dimensioned to support capacitor chip 2 so that its principal electrode-connecting axis is parallel to the principal axis of signal contact 6 in passage 17 while permitting relative axial movement of the capacitor and the walls of the passage 18. This allows the capacitor to be easily inserted and biased against tab 12 by a resilient finger 20 which is part of a ground plate structure 21 and is received within enlarged portion 19 of passage 18. The ground plate 21 is sandwiched between dielectric member 1 and a dielectric member 22, and includes an aperture 23 for the signal contact 6. Signal contact 6 must be insulated from the ground plate, as will be appreciated by those skilled in the art, either by a dielectric material or simply by preventing the signal contact from engaging the edges of the aperture.

Resilient members 20 are similar in concept to prior filter sleeve connection arrangements, except that only a single resilient member, formed by a single cut-out from the ground plate, is required for each capacitor. The resilient member 20 is preferably shaped so that a relatively large contact area 24 is provided at a distal end of the member, the distal end being displaced from the principal plane of the ground plate 21 in a direction parallel to the single contact and capacitor axes an amount sufficient to engage electrode 5 and provide a sufficient force to bias capacitor 2 against tab 12. In order to accommodate tab 12, a cut-out 25 is provided in insert 16, although the cut-out may also be provided in insert 1.

As will be apparent to those skilled in the art based on the above description, the present invention provides an exceptionally simple yet effective arrangement for installing a chip capacitor in an electrical connector between a signal contact and a ground plate. The ground plate may be electrically connected to the shell by any known means, and differs from that of conventional filter connector arrangements only in the use of resilient electrical contact fingers displaced from the ground plate in a direction parallel to the contact axis but having a contact surface parallel to the axis in order to engage ground electrodes provided on chip capacitors which also extend parallel to the axis. The chip capacitor is supported not by the contact or by the ground plate, but by a dielectric insert having parallel passages for the contact and for the chip capacitor. The electrical connection between the live electrode of the capacitor chip and the signal contact main body is established by a single tab extending transversely to the signal contact, as opposed to a receptacle provided in the contact body, thus permitting a greater contact density, a more secure electrical connection, a simpler contact structure, while nevertheless enabling the filter to be assembled without solder.

Having thus described in detail a specific arrangement for mounting a chip capacitor in an electrical connector, it will be appreciated by those skilled in the art that variations of the above-described preferred embodiment will be possible within the scope and spirit of the invention, for example by substituting an electrical component having parallel planar electrodes, but which is not a chip capacitor. Also, it will be appreciated by those skilled in the art that the terms parallel and transverse are intended to cover arrangements in which the directions deviate from exactly 0° and 90°, due to manufacturing tolerances and other considerations. Consequently, it is to be understood that the invention is not to be limited by the above description, but rather that it be interpreted solely in accordance with the amended claims, including all reasonable equivalents to which the inventor is entitled.

I claim:

1. A capacitive filtering arrangement for an electrical device, comprising:
    an electrical signal contact having a principal longitudinal axis extending between mating ends of the contact and a tab extending from the contact transversely to the longitudinal axis of said contact;
    dielectric retention means for supporting said contact in said electrical device and including a contact passage extending therethrough, said contact being located in said passage;
    a ground plate having a principal plane extending transversely to said longitudinal axis of said contact and an aperture through which said contact extends without electrically contacting the ground plate,
    wherein said dielectric retention means includes a component passage therethrough having a central axis parallel to said longitudinal axis, and said ground plate includes an extension having a distal end displaced from a principal plane of the ground plate in a direction parallel to said longitudinal axis, and
    further comprising an electrical component positioned in said component passage and having planar electrodes at opposite ends thereof of a principal axis of said component, one electrode of said component electrically engaging said distal end and the other electrode engaging said tab such that said component is supported by said dielectric retention means and said principal axis of said component is parallel to said longitudinal axis of said contact.

2. A filtering arrangement as claimed in claim 1, wherein said electrical device is an electrical filter connector.

3. A filtering arrangement as claimed in claim 1, wherein said electrical component is a chip capacitor.

4. A filtering arrangement as claimed in claim 3, wherein said contact includes an intermediate portion having a planar section which includes a cut-out, said cut-out forming said tab.

5. A filtering arrangement as claimed in claim 3, wherein said extension is resilient and said distal end includes an electrode engaging surface which is transverse to said principal axis of the component and parallel to a principal plane of the electrode.

6. A filtering arrangement as claimed in claim 1, wherein said contact includes an intermediate portion having a planar section which includes a cut-out, said cut-out forming said tab.

7. A filtering arrangement as claimed in claim 1, wherein said extension is resilient and said distal end includes an electrode engaging surface which is transverse to said principal axis of the component and parallel to a principal plane of the electrode.

8. An electrical filter connector, comprising:
an electrical connector shell;
an electrical signal contact having a principal longitudinal axis extending between mating ends of the contact and a tab extending from the contact transversely to the longitudinal axis of said contact;
dielectric retention means for supporting said contact in an electrical device and including a contact passage extending therethrough, said contact being located in said passage;
a ground plate electrically connected to said shell and having a principal plane extending transversely to said longitudinal axis of said contact and an aperture through which said contact extends without electrically contacting the ground plate,
wherein said dielectric retention means includes a component passage therethrough having a central axis parallel to said longitudinal axis, and said ground plate includes an extension having a distal end displaced from a principal plane of the ground plate in a direction parallel to said longitudinal axis, and
further comprising an electrical component positioned in said component passage and having planar electrodes at opposite ends thereof of a principal axis of said component, one electrode of said component electrically engaging said distal end and the other electrode engaging said tab such that said component is supported by said dielectric retention means and said principal axis of said component is parallel to said longitudinal axis of said contact.

9. A filtering arrangement as claimed in claim 8, wherein said electrical component is a chip capacitor.

10. A filtering arrangement as claimed in claim 9, wherein said contact includes an intermediate portion having a planar section which includes a cut-out, said cut-out forming said tab.

11. A filtering arrangement as claimed in claim 9, wherein said extension is resilient and said distal end includes an electrode engaging surface which is transverse to said principal axis of the component and parallel to a principal plane of the electrode.

* * * * *